US005335955A

United States Patent [19]

Pekka et al.

[11] Patent Number: 5,335,955

[45] Date of Patent: Aug. 9, 1994

[54] METHOD AND SYSTEM FOR SETTING THE HYDRAULIC PRESSURE INFLUENCING A GRAB MEMBER

[76] Inventors: Kolari Pekka, Rengaskatu 55; Kähönen Vesa, Sorvaajantie 1-3 C 24, both of SF-40900 Saynatsalo, Finland

[21] Appl. No.: 962,807

[22] PCT Filed: Jul. 1, 1991

[86] PCT No.: PCT/FI91/00204

§ 371 Date: Dec. 30, 1992

§ 102(e) Date: Dec. 30, 1992

[87] PCT Pub. No.: WO92/00913

PCT Pub. Date: Jan. 23, 1992

[30] Foreign Application Priority Data

Jul. 11, 1990 [FI] Finland ................................ 903516

[51] Int. Cl.⁵ ................................................ B25J 13/00

[52] U.S. Cl. ........................................ 294/88; 294/907; 901/37; 901/47

[58] Field of Search ....................... 294/86.4, 88, 907; 901/37, 46, 47; 414/730

[56] References Cited

U.S. PATENT DOCUMENTS

| | | | |
|---|---|---|---|
| 3,037,651 | 6/1962 | Smith . | |
| 3,730,368 | 5/1973 | Dalglish . | |
| 3,990,594 | 11/1976 | Olson et al. | 294/88 X |
| 4,047,025 | 9/1977 | Lemelson | 901/47 X |
| 4,397,495 | 8/1983 | Lewis | 294/88 |
| 4,579,380 | 4/1986 | Zaremsky . | |
| 4,591,198 | 5/1986 | Monforte | 294/88 |
| 4,613,942 | 9/1986 | Chen | 901/47 X |
| 4,715,773 | 12/1987 | Parker et al. . | |
| 4,730,862 | 3/1988 | Caen et al. | 294/88 |
| 4,748,570 | 5/1988 | Shochi et al. | 294/88 X |
| 4,784,421 | 11/1988 | Alvité | 294/88 X |
| 4,837,487 | 6/1989 | Kurakake et al. | 901/47 X |
| 5,042,862 | 8/1991 | Tübke | 294/86.4 |

FOREIGN PATENT DOCUMENTS

| | | |
|---|---|---|
| 2428772 | 5/1975 | Fed. Rep. of Germany . |
| WO88/02348 | 4/1988 | PCT Int'l Appl. . |

*Primary Examiner*—Dean J. Kramer
*Attorney, Agent, or Firm*—Jones & Askew

[57] ABSTRACT

The object of the invention is a method and a system for setting the hydraulic pressure influencing a hydraulic grab member by using adjustment members. The setting of the maximum value of the pressure takes place automatically by reading the identifying information on the piece (6) being handled by means of a reading device (1), on the basis of which the control unit (3) linked to the reading device (1) directs the adjustment member (4). When the operator of the system starts raising the hydraulic pressure from the hydraulic tank (13) by means of the operating valve (9) of the grab member (5), the adjustment member (4) limits the hydraulic pressure going to the compression cylinder (8) of the grab member (5) and thus a compressive force of the correct magnitude is directed onto the piece (6) being handled.

5 Claims, 2 Drawing Sheets

METHOD AND SYSTEM FOR SETTING THE HYDRAULIC PRESSURE INFLUENCING A GRAB MEMBER

The object of this invention is a method and system for setting the hydraulic pressure influencing a hydraulic grab member, in particular roll jaws, by using control members.

In various kinds of equipment handling single pieces, such as also in more extensive systems handling pieces, various kinds of operations are carried out, in which the force acting as a pressure on a piece is adjusted by controlling the hydraulic pressure influencing the hydraulic cylinder of the grab member. One example of equipment handling these kinds of pieces is a truck equipped with roll jaws or other appropriate grab member used in handling rolls of paper.

In present methods, the hydraulic pressure influencing the grab member is selected manually. The person driving the device handling the piece must, on the basis of the information that he has received, select what is to his mind an appropriate hydraulic pressure, which is directed to influence the grab member, and thus also the mechanical compressive force directed on the piece corresponding to the hydraulic pressure.

In this kind of system, which is based on manual pressure selection, the problem is precisely the manual form of operation, when the person is the factor in the system due to which undesirable results occur. In a manual system, handling mistakes take place, due to indifference and forgetfulness, as a result of which the mechanical compressive force directed onto the piece is wrong, often being too great, when the piece is damaged due to too great pressure.

For example, the trucks in use handling rolls of paper damage them in such a way that they cannot be used in the printing presses of a newspaper publisher, for even a depression of five millimeters caused by excessive compression may cause the rejection of the roll.

The intention of this invention is to create a method that avoids the aforementioned defects, and which makes it possible to set the hydraulic pressure influencing the grab member in such a way that such a mechanical compressive pressure is directed onto the piece without damaging it.

This intention is achieved by means of the method in accordance with the invention, of which it is characteristic that in the method identifying information is read by a reading device from an identifier on the piece being handled and that a control device setting the hydraulic pressure influencing the grab member is controlled by the identifying information and thus it also sets the compressive force directed onto the piece.

The method in accordance with the invention is based on the idea that the correct mechanical compressive force, which is directed onto the piece being handled is set automatically on the basis of the information read from the identifier on the piece.

By means of this method the possibility of the human error factor is removed, as in this method the setting of the maximum value is based on the information contained in the identifier, and not on a human choice.

It is further also possible to remove the errors in handling caused by human forgetfulness. Considerable economic savings can be achieved through the reduction of damage to the pieces being handled.

The object of the invention is also a system for setting the hydraulic pressure influencing a hydraulic grab member, which system consists of an adjustment member. It is characteristic of the system in question that a control unit is connected to the adjustment device, the control unit being connected to a reading device, which reads the identifier on the piece being handled, which either directly or indirectly states the pressure which may be directed onto the piece by the grab member. Generally the operating device used is a hydraulic cylinder, the greatest operating pressure of which is controlled according to the identifier information.

By means of a system of this kind it is possible to implement the constructions required by the pressure setting method and thus achieve the advantages offered by the method with an appropriately compact construction, one significant advantage of the construction being that for example when handling rolls of paper, rolls with varying compression resistant properties can be handled by the same truck in such a way that the rolls of paper are not damaged.

The invention is described in greater detail with the aid of the following examples of forms of application with reference to the accompanying figures.

The method in accordance with the invention and a system for implementing the method can be used with various kinds of devices for handling different pieces, of which one that is shown is a truck used for handling papers rolls, without, however, limiting the invention to this purpose.

Here the system implementing the method is located in a conventional hydraulic system using roll jaws 5', which here is shown considerably simplified. The figure does not show among other things the conventional protection devices for the pump, which have no significance from the point of view of the invention.

Figure 1:
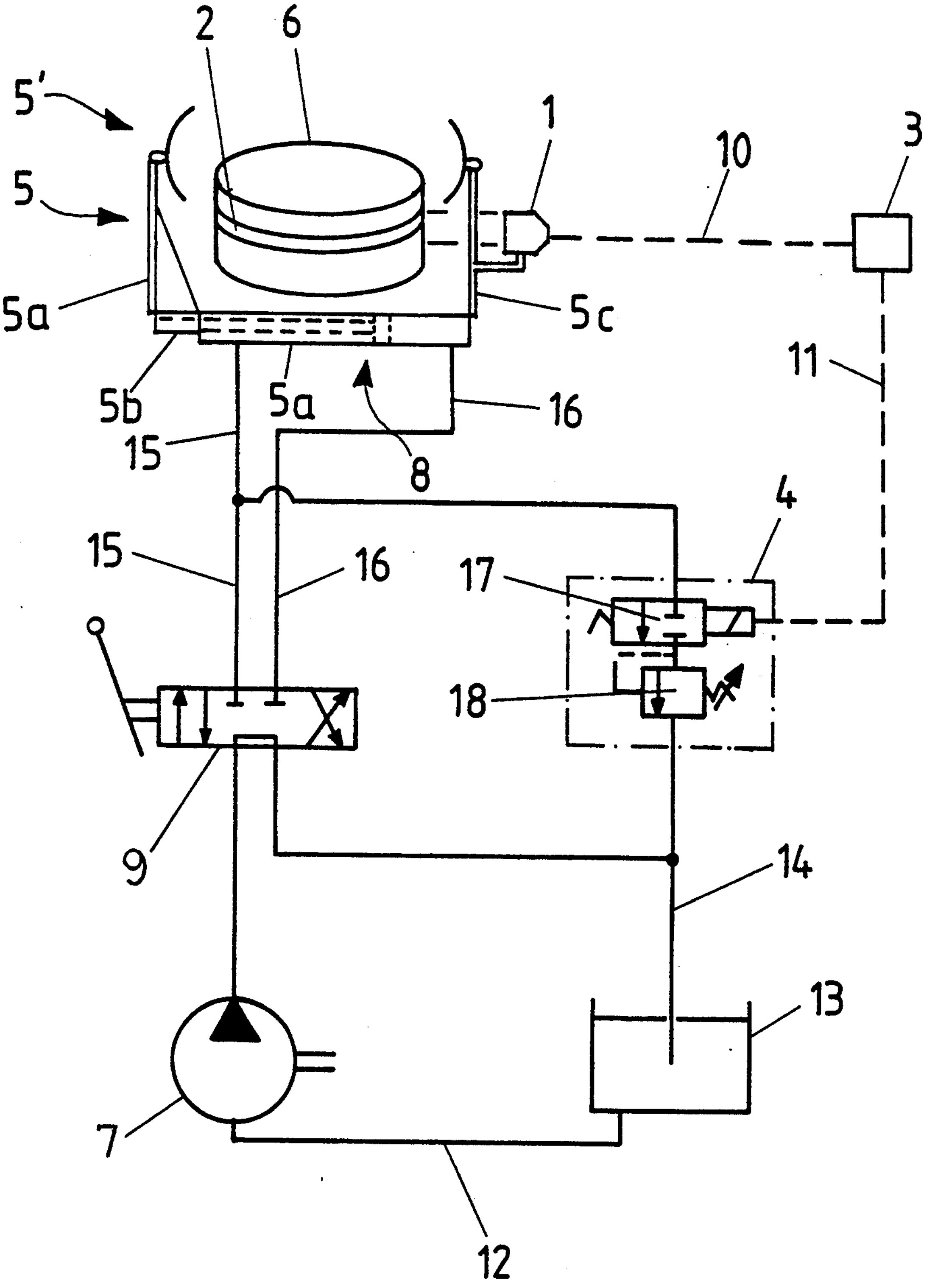
FIG. 1 shows the method in accordance with the invention and a schematic diagram for a system in accordance with the method.
Figure 2:
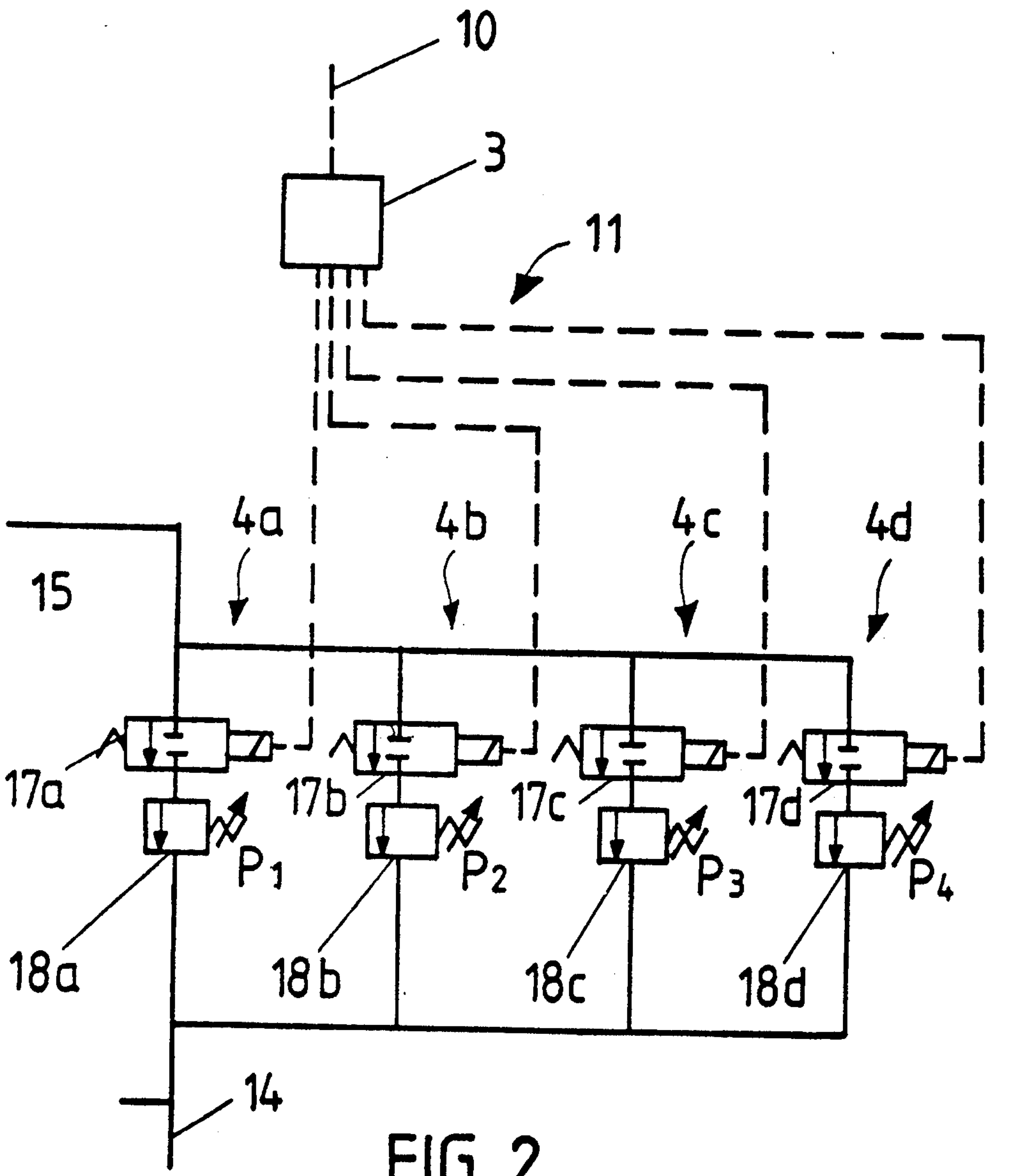
FIG. 2 shows an adjustment member consisting of a four-place pressure-selection valve.
Figure 3:
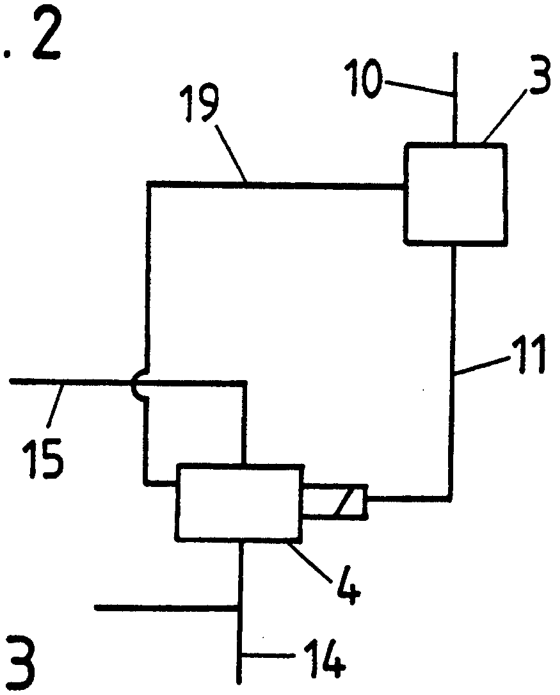
FIG. 3 shows a re-connectable, steplessly adjustable adjustment member.

Paper rolls are handled by means of a truck using the aforementioned roll jaws 5'. In FIG. 1 the grab member is marked by the reference number 5 in general, and here roll jaws in particular by the reference number 5'. The roll jaws 5' consist of a moving jaw **5*a* operated by a piston rod 5*b* and a fixed jaw 5*c* to which the frame section 5*a* of the cylinder 8 is also attached. By feeding oil to the connection on the piston rod 5*b* side, i.e. to the hydraulic line 15, the jaws 5*a* and 5*b* of cylinder 8 begin to approach one another and press the roll 6** between them.

As in a conventional system, pressurized oil produced by a hydraulic pump 7 is led through a three-way operating valve to one or other of the connections, i.e. hydraulic lines 15 or 16, or to the return line 14. Here the hydraulic pump 7 draws the oil through hydraulic line 12 direct from the hydraulic tank 13, without a separate feed pump.

The system in accordance with the invention is constructed between the compression side hydraulic line 15 and the return line 14 of the compression cylinder 8. In place of the return line it is possible to also use the hydraulic line leading directly to the tank, or generally any low-pressure return side line at all.

In the system implementing the method in accordance with the invention shown in the figures the reading device 1 reads the information contained in the identifier 2 in the piece 6 being handled, in this case a roll of paper. The identifier 2 may be attached or marked also on the protective wrapping of the piece 6 being handled, the transport base, or some other place, from which the identifier 2 can be easily read when the piece 6 is being handled. The identifier 2 either directly or indirectly expresses the maximum value of the compressive pressure that can be directed onto piece 6, without it being in danger of being damaged. In this connection the term 'indirect expression' means that the identifier contains information for example of the type of the piece 6 being handled or of some other factor, on the basis of which the piece 6 being handled and thus also of the compression-resistance properties of the piece 6 being handled can be recognized.

The identifier 2 to be read by the reading device 1 can be realized for example by a bar code, an infra-red identifier, accompanying memory or other identifier suitable for the purpose. The reading device 1 thus corresponds to the type of the identifier 2 and is for example a bar code reading device, an infra-red identifier reading device, an accompanying memory reading device, or other reading device suitable for this purpose.

The reading device 1 and the control unit 3 can be realized using bar code readers manufactured by SAAB AUTOMATION AB, e.g. the CCD camera model PANT-120. The truck terminal 9450 manufactured by the INTERMEK Corp. can also be used here.

The identifier 2 is advantageously attached to the piece 6 to be handled in such a way that when handling the piece 6 with the roll jaws 5' the identifier 2 is not covered by the roll jaws 5'. The identifier 2 is sufficiently large in size so that the identifier 2 can be easily read by the reading device 1, without special movements being required to be made to the piece 6 to be handled.

The reading device 1 is attached to the truck, advantageously to the roll jaws of the truck, in such a way that before gripping the paper roll, or at the initial stage of gripping it, the identifier 2 attached to the paper roll can be easily read by the reading device 1.

The connection 10 between the reading device 1 and the control unit 3 is advantageously implemented by a wireless form of communication, for example by an optic or radio frequency transmitter—receiver combination.

In the second advantageous form of application the connection between the reading device 1 and the control unit 3 is formed by a simple cable.

The control unit 3 is realized by, for example, a programmable micro-circuit, which is programmed in such a way that, on the basis of the information read from the identifier 2, the control unit 3 directs the adjustment device 4 so that the adjustment device 4 sets the maximum pressure to correspond to the identifier information and further to the compression-resistance properties of the paper roll. The adjustment member 4 consists of two parts—an electrically controlled shut-off valve 17 and a safety valve 18.

In one advantageous form of application in accordance with the invention the control unit 3 is connected to an adjustment device 4, which is formed of two or more, advantageously of four, electrical pressure valves *4a–4d*, adjusted in steps in relation to one another, each of which is connected to hydraulic lines 14 and 15. The stepped settings are based on the known various compression-resistance properties of the different kinds of pieces to be handled.

The control unit 3 selects through the connection 11 one of the electrically controlled pressure valves *4a–4d* of the adjustment device 4, which are adjusted to different opening pressures and in which case the pressure value of the pressure valve corresponds to the identifier information. The other valves remain closed at the same time as the selected pressure valve begins to control the pressure of the hydraulic line 15. Each pressure valve *4a–4d* here too consists of two parts—an electrically operated shut-off valve *17a–17d* and a safety valve *18a–18d*.

The pressure valves *4a–4d* are most advantageously formed as a valve block by exploiting the so-called cartridge technique, this replacing separate components.

After the automatic pressure valve selection the truck driver or corresponding operator uses the operating valve 9 of the roll jaws 5' in the normal manner, when the pressure valve selected on the basis of the identifier 2 limits the pressure of the hydraulic oil going to the cylinder 8 through hydraulic line 15 to a certain maximum pressure. At this pressure the hydraulic oil flow produced by pump 7 begins to travel through the limiting pressure valve back to the return line 14.

The compressive force directed onto the paper roll 6 is determined in accordance with the pressure of the hydraulic oil lead to the hydraulic cylinder 8 and here in particular to its piston rod *5b* side end.

Naturally the connection at the compression side of the cylinder may be in another kind of roll jaws also on the piston side. There are numerous different kinds of roll jaws with various types of mechanisms and in these more than one hydraulic cylinders are often used.

In the second advantageous form of application in accordance with the invention a single electrical pressure valve is used as the adjustment member 4, in which case the control unit 3 directs adjustment member 4, from which there is then a return connection 19 to the control unit 3 to adjust by means of the adjustment member 4 the pressure steplessly to correspond to the identifier information and thus the force directed onto the paper roll 6 being handled by the roll jaws. In place of the return connection the pressure valve may have two or more adjustment values stepped in relation to one another set by electrical adjustment circuits, of which the control unit 3 selects one.

The drawings and the related description are only intended to illustrate the invention under discussion. In terms of details the method in accordance with the invention and the system for setting the hydraulic pressure influencing the hydraulic grab member under discussion may be varied within the terms of the accompanying Patent Claims.

We claim:

1. A system for setting the hydraulic pressure influencing a hydraulic grab member (5), which system comprises a hydraulic operating device including a hydraulic cylinder (8) for the grab member (5), a source of hydraulic pressure, and a pressure adjustment device, characterized in that a control unit (3) is connected to the adjustment device (4), the control unit (3) being linked to a reading device (1), by means of which an identifier (2) on the piece (6) being handled can be read, the identifier (2) either directly or indirectly expressing the force that may be directed onto the piece (6) by the grab member (5);

at least two electric pressure valves (4*a*, 4*b*, . . . ) which are set to different pressure values; and a low-pressure hydraulic oil return line (14), characterized in that each pressure valve (4*a*, 4*b*, . . . ) is connected between a hydraulic line (15) of the compression side of the hydraulic cylinder (8) and the aforementioned return line (14).

2. A system in accordance with claim 1, wherein each pressure (4*a*, 4*b*, . . . ) is connected to the control unit 93), so that at least one of the pressure valves (4*a*, 4*b*, . . . ) at a time can be selected to limit the hydraulic pressure going to the hydraulic cylinder (8) of the grab member (5).

3. A system for setting the hydraulic pressure influencing a hydraulic grab member (5), which system comprises a hydraulic operating device including a hydraulic cylinder (8) for the grab member (5), a source of hydraulic pressure, and a pressure adjustment device, characterized in that a control unit (3) is connected to the adjustment device (4), the control unit (3) being linked to a reading device (1), by means of which an identifier (2) on the piece (6) being handled can be read, the identifier (2) either directly or indirectly expressing the force that may be directed onto the piece (6) by the grab member (5);

at least two electric pressure halves (4*a*, 4*b*, . . . ) which are set to different pressure values; and each pressure valve (4*a*, 4*b*, . . . ) is connected to the control unit (3), in which case at least one of the pressure valves (4*a*, 4*b*, . . . ) at a time can be selected to limit the hydraulic pressure going to the hydraulic cylinder (8) of the grab member (5).

4. A system for setting the hydraulic pressure influencing a hydraulic grab member (5), which system comprises a hydraulic operating device including a hydraulic cylinder (8) for the grab member (5), a source of hydraulic pressure, and a pressure adjustment device, characterized in that a control unit (3) is connected to the adjustment device (4), the control unit (3) being linked to a reading device (1), by means of which an identifier (2) on the piece (6) being handled can be read, the identifier (2) either directly or indirectly expressing the force that may be directed onto the piece (6) by the grab member (5);

the adjustment device (4) comprises one electrical pressure regulation valve; and a return connection (19) from the pressure regulation valve to the control unit (3), by means of which the hydraulic pressure going to the hydraulic cylinder (8) operating the grab member (5) can be adjusted steplessly.

5. A system for setting the hydraulic pressure influencing a hydraulic grab member (5), which system comprises a hydraulic operating device including a hydraulic cylinder (8) for the grab member (5), a source of hydraulic pressure, and a pressure adjustment device, characterized in that a control unit (3) is connected to the adjustment device (4), the control unit (3) being linked to a reading device (1), by means of which an identifier (2) on the piece (6) being handled can be read, the identifier (2) either directly or indirectly expressing the force that may be directed onto the piece (6) by the grab member (5);

the adjustment device (4) comprises one electrical pressure regulation valve; and at least two different opening pressure values are set for the pressure valve by means of electrical control circuits, of which values the control unit (3) selects one.

* * * * *